United States Patent [19]

Oberkircher

[11] 3,999,677
[45] Dec. 28, 1976

[54] PLASTIC LID FOR CONTAINERS

[75] Inventor: Fred D. Oberkircher, Cleveland, Ohio

[73] Assignee: Van Dorn Company, Cleveland, Ohio

[22] Filed: June 30, 1975

[21] Appl. No.: 591,419

[52] U.S. Cl. .............................. 220/266; 220/306; 220/355; 220/72; 220/74; 220/70; 215/320
[51] Int. Cl.² ...................................... B65D 17/02
[58] Field of Search ............... 220/306, 70, 72, 74, 220/267, 265, 266, 307, 308, 355; 215/321, 253, 320

[56] References Cited

UNITED STATES PATENTS

| | | | |
|---|---|---|---|
| 3,179,283 | 4/1965 | Amberg | 220/306 |
| 3,373,896 | 3/1968 | Davis | 220/306 |
| 3,474,928 | 10/1969 | Hurtt | 220/306 |
| 3,627,170 | 12/1971 | Pulliam | 220/306 |
| 3,811,597 | 5/1974 | Frankenberg et al. | 220/306 |
| 3,856,171 | 12/1974 | Rossi | 220/306 |

Primary Examiner—George E. Lowrance
Assistant Examiner—Joseph M. Moy
Attorney, Agent, or Firm—Meyer, Tilberry & Body

[57] ABSTRACT

There is provided an improvement in a molded plastic container lid for sealing an open top container including a peripheral wall having an inner surface, a top edge and provided with an outwardly projecting, peripheral sealing bead with a downwardly facing portion. This type of lid includes a circumferentially extending bead engaging means including first means for engaging the inner surface of the peripheral wall and a second means for engaging the bead. The second means includes an inwardly extending ledge means having an upwardly facing surface for engaging the downwardly facing portion of the bead. This improvement comprises providing the upwardly facing surface of the inwardly extending ledge means as a horizontal surface.

2 Claims, 6 Drawing Figures

U.S. Patent  Dec. 28, 1976  Sheet 1 of 2  3,999,677
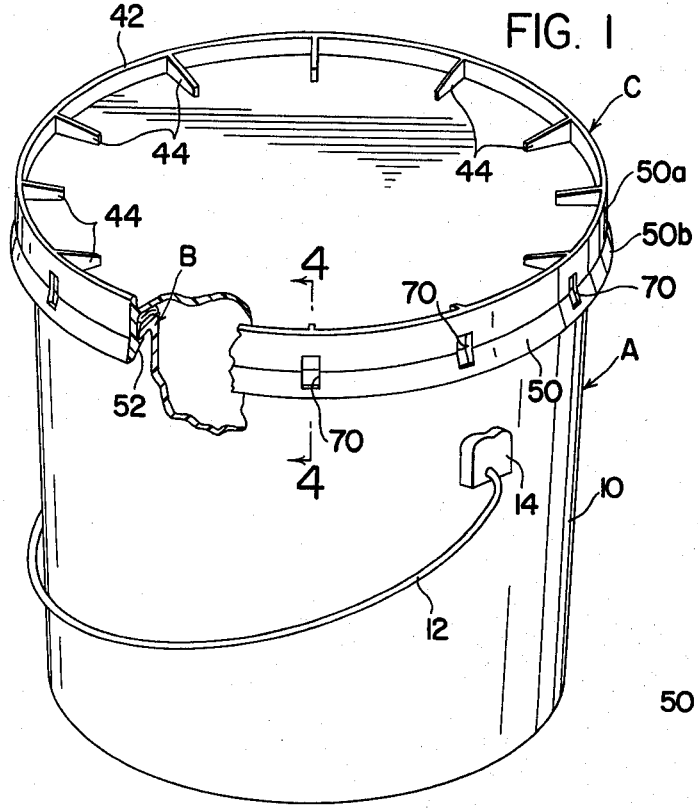
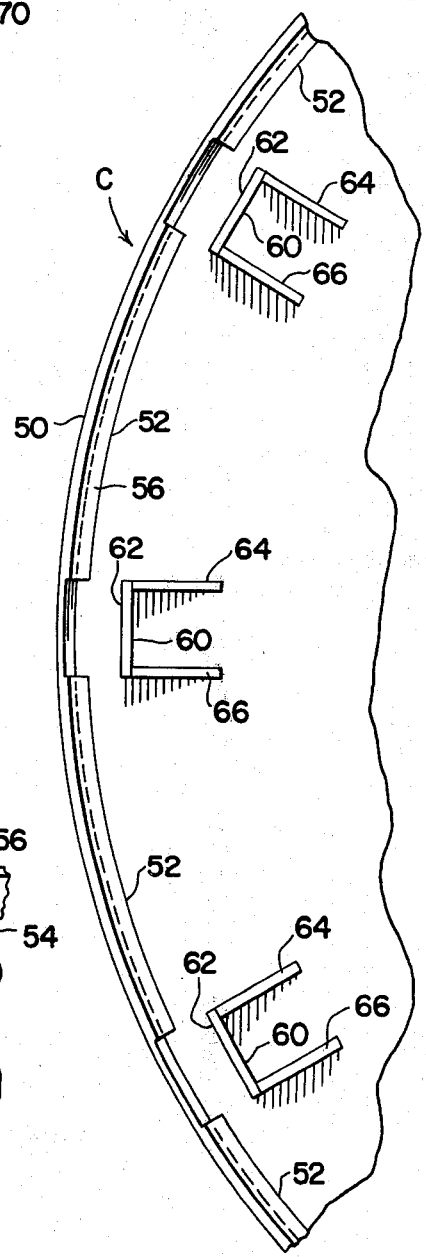
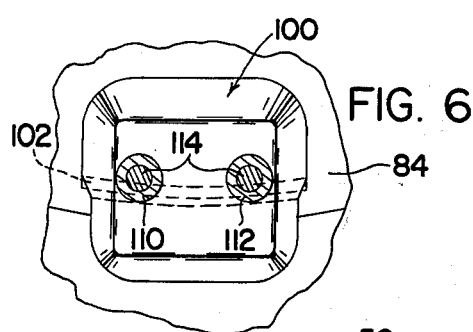
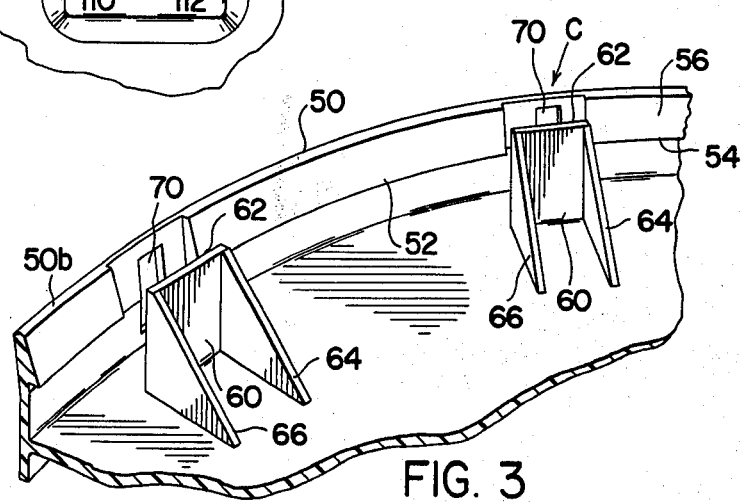

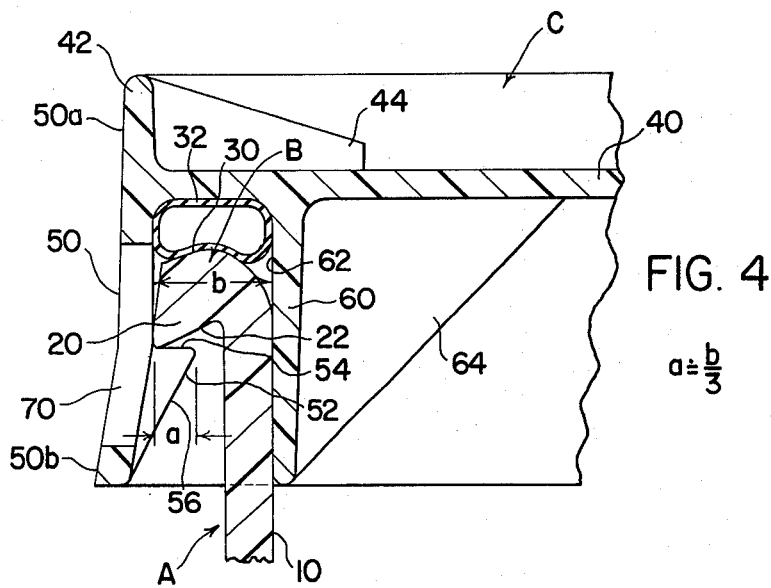
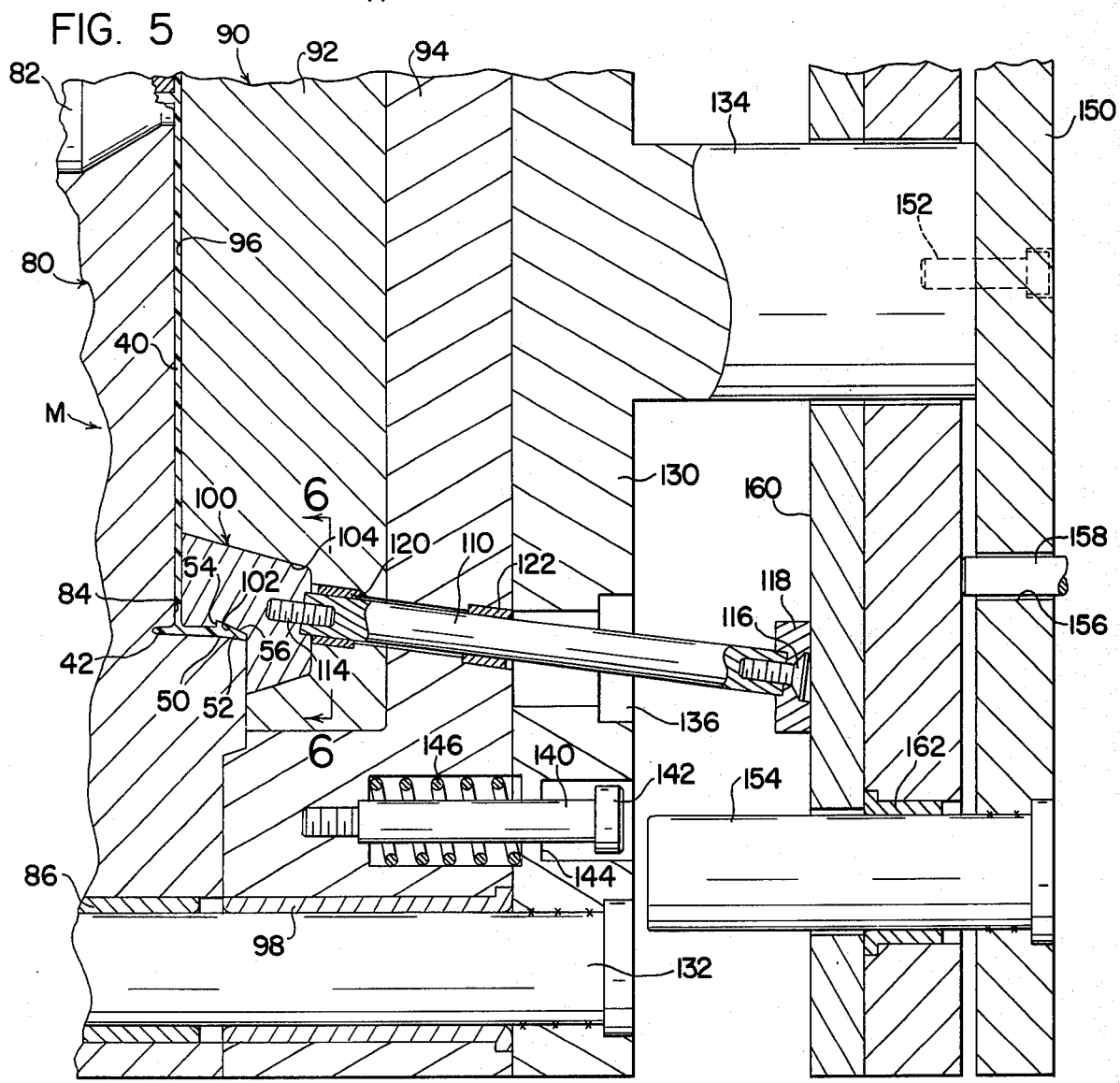

PLASTIC LID FOR CONTAINERS

This invention relates to the art of molded plastic lids for containers and more particularly to an improved lid for a molded plastic container which provides a stronger holding force when closed.

The invention relates particularly to a lid for sealing the top of a molded plastic pail or container having a plastic sealing bead along the top edge thereof, and it will be described with particular reference thereto; however, it is appreciated that the invention has broader applications and may be used for a lid for various types of containers.

In recent years, it has become somewhat common practice to provide plastic pails with integral sealing beads extending around the open end thereof. These sealing beads are engaged by a generally U-shaped recess on a plastic lid to provide the closing structure for the lid over the pail or container. This bead and lid structure is well adapted for mass production by molding techniques. However, when both the lid and container are formed from plastic, substantial difficulty has been experienced in providing acceptable holding forces between the lid and container. To increase the holding force, the bead around the top of the pail has been modified as shown in prior U.S. Pat. No. 3,826,404 and 3,831,798. These patents are incorporated by reference herein. The modification of the bead to provide a somewhat flexible lip structure as taught by the prior patents has been successful in increasing the holding force between the lid and container. In addition, the lid itself, when a plastic lid is being used, has been modified to provide an inwardly directed protrusion having an upwardly facing angled surface as shown in U.S. Pat. No. 3,831,798. This structure has proven somewhat satisfactory in meeting the requirements for the holding force between the lid and container. Heretofore, the inwardly facing surface or holding ledge tapered downwardly to allow removal of the plastic lid from the mold during the molding process. This downwardly tapering surface for plastic container lids has been somewhat universally adopted. To increase the holding force of this surface with respect to the integral plastic bead, the lid fit tightly over the bead and was provided with a tear portion which was removed to open the container. The provision of a tight or close fit and a tear strip to function in combination with the inward protrusion engaging the lower portion of the bead has increased the holding force of the plastic lid for a plastic container to an extent which is now acceptable for shipping most substances. However, the requirements for the closing force are continuing to increase. For this reason, even further improvements in the force required to dislodge the plastic lid from a molded plastic container are being sought. The present invention relates to such an improvement for a structure of the general type shown in U.S. Pat. No. 3,831,798.

In accordance with the present invention, a molded plastic container lid for sealing the open top of a container, as shown in the prior patent, is improved by modifying the inwardly facing protrusion so that the upward facing surface thereof is generally horizontal, as opposed to facing downwardly as in the prior art. In this manner, when a force is applied in a direction to remove the lid, the horizontal surface on the lid itself engages the under, or downwardly facing, portion of the bead to substantially increase the force required to remove the lid from the container. This further improvement in the holding force of the lid on a container makes plastic covers for plastic pails substantially more acceptable for the transportation of various substances. In accordance with the preferred embodiment of the invention, the inward protrusion is formed from a plurality of separate, circumferentially spaced segments.

In accordance with another aspect of the invention, the ledges or protrusions of each segment, as defined above, are spaced circumferentially around the lid. In this manner, portions between the ledges may be perforated to allow severance of the container lid at various circumferentially spaced positions to facilitate removal of the lid from the container.

The primary object of the present invention is the provision of an improved molded plastic lid for a container, which lid has an increased holding force with respect to a bead extending around the upper portion of the container.

Yet another object of the present invention is the provision of a molded plastic container lid, as defined above, which lid is easy to produce and does not substantially increase the cost of the lid.

Still a further object of the present invention is the provision of a molded plastic container lid, as defined above, which lid includes an inwardly directed protrusion, rib or ledge having a generally horizontal, upwardly facing surface which engages the under portion of the sealing bead for increasing the holding force of the container lid with respect to the container.

These and other objects and advantages will become apparent from the following description taken together with the accompanying drawings, in which:

FIG. 1 is a pictorial view showing the preferred embodiment of the present invention;

FIG. 2 is an enlarged lower, partial view showing the preferred embodiment of the present invention;

FIG. 3 is a pictorial view showing the preferred embodiment of the present invention as shown in FIG. 2;

FIG. 4 is an enlarged cross-sectional view taken generally along line 4—4 of FIG. 1;

FIG. 5 is a schematic, cross-sectional view showing certain features of the molding process used in producing the preferred embodiment of the present invention; and, FIG. 6 is a partial view showing one of the several retractable cam molding elements used in the molding process schematically illustrated in FIG. 5.

Referring now to the drawings, wherein the showings are for the purpose of illustrating the preferred embodiment of the invention only, and not for the purpose of limiting same, container A is a molded plastic container including an upper bead B defining an upper opening which is adapted to be closed by a molded plastic lid C. The lid is constructed in accordance with the preferred embodiment of the present invention. Container A, in accordance with normal practice, includes a generally vertical sidewall 10, a bottom wall not shown, and a bail or handle 12 secured to the container A by appropriate lugs 14, only one of which is shown. The bead B is constructed in accordance with the teachings of prior U.S. Pat. No. 3,826,404 and includes a downwardly extending lip 20, as best shown in FIG. 4. A downwardly facing conical surface 22 is provided at an angle of approximately 30°–60° with respect to wall 10 to increase the holding force of lid C on container A. The bead also includes an upper sealing portion for engaging circular, hollow seal 32 when the lid is in place over the container.

Lid C is constructed in accordance with the present invention and includes a generally flat closure wall 40 extending over the opened top of container A. A reinforcing ring 42 extends upwardly from the lid and provides an abutment for radially extending reinforcing ribs 44. These ribs and the reinforcing ring combine to rigidify lid C in the sealing area of the lid. Of course, these reinforcing members may not be needed in all instances. Below ring 42, lid C is provided with a downwardly extending apron 50 having a generally vertical portion 50a and an outwardly flared portion 50b. As best shown in FIGS. 2, 3 and 4, apron 50 includes a plurality of circumferentially spaced inwardly extending ledge means or ribs 52 which form the holding means for the lid when it is secured over the open end of container A. Each of the ledge means or ribs 52 include an upper surface 54. This surface forms an essential part of the present invention and is generally horizontal. In the past, the ledge means or the inwardly extending rib of a molded plastic lid tapered downwardly which reduces its holding force with respect to upward removal movement of the lid from the container. Of course, the surface may have a slight taper downwardly without departing from the broadest aspect of the invention. However, in accordance with the preferred embodiment of the invention, this taper, if any, is only sufficient to allow proper molding and the surface 54 is generally horizontal and generally perpendicular to wall 10 when the lid is assembled onto the container. The under surface of ledge means 52 is provided with an outwardly tapered, downwardly facing surface 56 which allows a snap action during assembly of lid C on container A. The angle of surface 56 may vary to provide the necessary snap action. As is known, bead B is generally received in a U-shaped recess extending circumferentially around the periphery of a molded plastic lid. This U-shaped recess is, in essence, provided, in the preferred embodiment of the invention, by apron 50 and circumferentially spaced abutments 60 having outwardly facing surfaces 62 which are shown to be straight, but which could be somewhat curvilinear in the direction of apron 50. Abutments 60 are spaced between ledge means 52 and include rearwardly extending support rails 64, 66 integrally molded with lid C. These spaced abutments and ledge means 52 provide the holding action between lid C and container B. As shown in FIG. 4, the transverse dimension a of surface 54 is approximately one-third of the dimension b which is between apron portion 50a and surface 62. This spacing can be varied according to the plastic used and other variables in the molded plastic lid. As is apparent in FIG. 4, surface 54 engages the under surface of bead B in the lip area thereof to provide the holding force. Of course, seal 32 may be compressed more than the compression schematically illustrated in FIG. 4. The use of a horizontal surface 54 for the inwardly extending protrusion or ledge means 52, increases the holding force. In some instances when an initial increased holding force is desired for shipping and handling, apron 50 is provided with areas to be cut at spaced positions around the lid. This allows a tighter fit for the lid before the apron is cut. To facilitate this type of removal, openings or perforations 70 are molded into the apron. These perforations provide areas which may be severed by an appropriate knife or other tool to facilitate removal after a closed container has been shipped to its location of use. By severing two or more locations around apron 50, lid C may be more easily removed from the container by allowing outward movement of ledge means or protrusions 52.

Referring now to FIGS. 5 and 6, a molding device and method for producing the generally horizontal surface 54 in the plastic molded lid is illustrated. In this illustration, mold M includes an upper relatively fixed section 80 having a sprue 82 and upper cavity wall 84 provided within section 80. Bushings 86 are provided in upper section 80 for a purpose to be described later. A relatively movable section 90 includes plates 92 and 94 which are secured together. Plate 92 includes a lower cavity wall 96 which combines with upper cavity wall 84 to define basically the cavity into which plastic is injected through sprue 82. At each of the various ledge means 52 there is provided a cam element 100, only one of which is shown in FIG. 5. This cam element includes an under cut portion 102 which defines surfaces 54, 56. In the molding position as shown in FIG. 5, elements 100 are received in cavities 104 which are contoured to close the molding cavity to produce the relatively horizontal surface 54 at various locations circumferentially around the bead engaging portion of lid C. When the sections 80, 90 are separated, cam elements 100 move inwardly to release a molded container lid from the molding core. With such inward moving cam elements, or equivalent structure, the horizontal disposition of surface 54 can be provided and still allow removal of the cover from the mold. To move cam elements 100, two camming rods 110, 112, one of which is shown in FIG. 5, are provided for each of the cam elements. These camming rods each include a bolt 114 for securing the rods onto the under surface of a cam element. In addition, the lower end of rods 110, 112 include heads 116 which secure the rods with respect to a sliding block 118. Reciprocal movement of rods 110, 112 with respect to plates 92, 94 is provided by axially spaced bushings 120, 122.

Auxiliary drive plate 130 includes pins 132, only one of which is shown, a drive block 134 and a clearance opening 136 for the rods 110, 112. Auxiliary drive plate 130 is connected to plates 92, 94 by a plurality of stripper bolts 140, only one of which is shown, each having a head 142 which engages a shoulder 144 in drive plate 130. A spring 146 biases plates 92, 94 outwardly from auxiliary drive plate 130. A main drive plate 150 is controlled by the normal movable platen of the plastic, injection molding machine. This plate is fixedly secured onto block 134 of auxiliary plate 130 by at least one bolt 152. Thus, plates 130, 150 move in unison as the platen of the press is reciprocated. A plurality of knock-out holes 156, only one of which is shown, are provided in the main drive plate to receive standard knock-out pins 158 which selectively engage the two piece knock-out plate 160. Bushings 162 reciprocally mount knock-out plates 160 for selective movement by knock-out pins 158.

In operation, the mold elements are positioned as indicated in FIG. 5 and cam elements 100 are located in cavities 104 to define a cavity which will produce a horizontal surface 54 at the various ledge means 52 circumferentially spaced around lid C. After a molded plastic lid has been formed, as shown in FIG. 5, the movable platen of the press is moved away from sprue 82 which moves main drive plate 150. Pins 154 slide in bushing 162. In a like manner, auxiliary drive plate 130 is moved away from plates 92, 94. This movement is controlled by pins 132 in bushings 86, 98. Until heads 142 of stripper bolts 140 engage shoulders 144, spring 146 maintains plates 92, 94 and elements 100 in the position shown in FIG. 5. This allows movement of auxiliary plate 130 with respect to plates 92, 94 for control of other operations in the molding process which are not related to the present invention. Indeed, auxiliary plate 130 could be fixedly secured to plates 92, 94 without affecting the description of the method for providing horizontal surfaces 54 in lid C. After shoulders 144 have been engaged by heads 142, further reciprocation of the platen then moves plates 92, 94 with auxiliary drive plate 130. When this happens, plate 92 moves from fixed section 80 and carries therewith the molded container lid. At an appropriate time, knock-out pins 158 move forward to engage knock-out plate 160. This stops rearward movement of rods 110, 112. Consequently, further reciprocation of drive plate 150 away from fixed section 80 drives plates 92, 94 downwardly with respect to rods 110, 112. This shifts the rods inward away from apron 50 which, in turn, shifts elements 100 inward to disengage under cut 102 from surface 84. Still further movement of plate 150 causes ejection of molded lid C by protrusion of elements 100 outward from plate 92. In this manner, a relatively horizontal surface 54 can be provided at the various circumferentially spaced ledges 52. Since this engagement of elements 100 is parallel to the surface 54, surface 54 can be horizontal without requiring any significant draft. Of course, other arrangements could be provided in a plastic mold to provide the generally horizontal engaging surfaces for the protrusion engaging the under surface of bead B.

Having thus defined my invention, I claim:

1. In a molded plastic container lid for sealing an open top container said container including a peripheral wall having an inner surface, a top edge and provided with an outwardly projecting peripheral sealing bead with a downwardly facing portion, said lid comprising a general flat closure wall and a bead engaging means extending circumferentially, said bead engaging means including a first means for engaging said inner surface of said peripheral wall and a second means for engaging said bead, said first means comprising a series of circumferentially spaced abutment members extending downwardly from said closure wall and adapted to engage said inner surface when said lid is secured onto said container, said second means including a circumferentially continuous apron formed integrally along the circumference of said closure wall and carrying an inwardly extending ledge means with an upwardly facing surface extending generally horizontally, said ledge means including a locking portion and said locking portion being interrupted by circumferentially spaced areas and each of said abutment members being generally opposite to and aligned with each of said spaced areas.

2. The improvement as defined in claim 1 including means for allowing selective cutting of said apron at said spaced area.

* * * * *